US010295830B2

United States Patent
Hong et al.

(10) Patent No.: US 10,295,830 B2
(45) Date of Patent: May 21, 2019

(54) LASER LIGHT SOURCE SHUTTER SYSTEM USING A VARIABLE FOCUS OPTICAL ELEMENT

(71) Applicant: KOREA ELECTRONICS TECHNOLOGY INSTITUTE, Gyeonggi-do (KR)

(72) Inventors: Ji Soo Hong, Seoul (KR); Hoon Jong Kang, Gyeonggi-do (KR); Sung Hee Hong, Seoul (KR); Choon Sung Shin, Seoul (KR); Young Min Kim, Seoul (KR)

(73) Assignee: KOREA ELECTRONICS TECHNOLOGY INSTITUTE, Gyeonggi-Do (KR)

( * ) Notice: Subject to any disclaimer, the term of this patent is extended or adjusted under 35 U.S.C. 154(b) by 0 days.

(21) Appl. No.: 15/317,203

(22) PCT Filed: Dec. 1, 2015

(86) PCT No.: PCT/KR2015/012982
§ 371 (c)(1),
(2) Date: Dec. 8, 2016

(87) PCT Pub. No.: WO2017/094928
PCT Pub. Date: Jun. 8, 2017

(65) Prior Publication Data
US 2018/0267324 A1 Sep. 20, 2018

(30) Foreign Application Priority Data

Nov. 30, 2015 (KR) .................. 10-2015-0168304

(51) Int. Cl.
*G02B 26/00* (2006.01)
*G02B 27/09* (2006.01)
*H01S 3/00* (2006.01)

(52) U.S. Cl.
CPC ......... *G02B 27/0955* (2013.01); *G02B 26/00* (2013.01); *G02B 27/0983* (2013.01); *H01S 3/0085* (2013.01)

(58) Field of Classification Search
CPC .................. G02B 27/0955; G02B 27/0983; G02B 27/09; G02B 26/00
(Continued)

(56) References Cited

U.S. PATENT DOCUMENTS 4,827,125 A * 5/1989 Goldstein .......... G02B 21/0036
250/216
5,414,451 A * 5/1995 Sugiyama .............. G11B 7/004
347/258
(Continued)

*Primary Examiner* — William R Alexander
(74) *Attorney, Agent, or Firm* — The PL Law Group, PLLC

(57) ABSTRACT

A laser light source shutter system includes a light source, a variable focus optical element to transmit a beam emitted from the light source, a pinhole located on an optical path through which the beam travels from the variable focus optical element, and a controller to control a transmission and blocking of the beam by controlling a focal length of the variable focus optical element to be equal to a distance between the variable focus optical element and the pinhole or to be equal to other distances different from the distance. Therefore, a laser light source shutter free from vibration can be realized electronically with a low cost and a high light-blocking rate using a variable focus optical element such as a variable focus lens and a variable focus mirror.

12 Claims, 7 Drawing Sheets

(58) Field of Classification Search
USPC .......................................................... 359/676
See application file for complete search history.

(56) References Cited

U.S. PATENT DOCUMENTS

| | | | | |
|---|---|---|---|---|
| 5,838,239 A * | 11/1998 | Stern | ...................... | B64D 15/20 |
| | | | | 340/583 |
| 6,595,642 B2 * | 7/2003 | Wirth | ................... | A61L 31/048 |
| | | | | 351/211 |
| 6,631,226 B1 * | 10/2003 | Schoeppe | ............ | G02B 21/002 |
| | | | | 385/33 |
| 2002/0070328 A1 * | 6/2002 | Kimura | ................ | G11B 7/0916 |
| | | | | 250/201.5 |
| 2003/0223248 A1 * | 12/2003 | Cronin | ..................... | G01J 3/10 |
| | | | | 362/555 |
| 2006/0279820 A1 * | 12/2006 | Riley | .................. | G02B 7/004 |
| | | | | 359/15 |
| 2007/0247638 A1 * | 10/2007 | Owner-Petersen | .... | A61B 3/156 |
| | | | | 356/511 |
| 2008/0252977 A1 * | 10/2008 | Iwamoto | ................. | G02B 27/22 |
| | | | | 359/559 |
| 2009/0040903 A1 * | 2/2009 | Tokuyama | ........... | G11B 7/0065 |
| | | | | 369/103 |
| 2010/0090113 A1 * | 4/2010 | Sasaki | .................... | G11B 7/005 |
| | | | | 250/362 |
| 2010/0134867 A1 * | 6/2010 | Gugel | ................ | G02B 21/0064 |
| | | | | 359/287 |
| 2011/0172649 A1 * | 7/2011 | Schuele | .................. | A61F 9/008 |
| | | | | 606/4 |
| 2011/0300490 A1 * | 12/2011 | Rachet | ............... | G02B 21/0032 |
| | | | | 430/322 |
| 2013/0286404 A1 * | 10/2013 | Cenko | .................... | G01B 11/26 |
| | | | | 356/508 |
| 2013/0343053 A1 * | 12/2013 | Holman | ................. | G03B 21/00 |
| | | | | 362/241 |
| 2014/0226158 A1 * | 8/2014 | Trainer | .................... | G02B 6/32 |
| | | | | 356/336 |
| 2015/0234178 A1 * | 8/2015 | Azuma | .............. | G02B 26/0875 |
| | | | | 359/201.2 |
| 2016/0114434 A1 * | 4/2016 | Regaard | ............... | B23K 26/046 |
| | | | | 219/121.85 |

\* cited by examiner

LASER LIGHT SOURCE SHUTTER SYSTEM USING A VARIABLE FOCUS OPTICAL ELEMENT

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/012982, filed Dec. 1, 2015, which claims priority to the benefit of Korean Patent Application No. 10-2015-0168304 filed in the Korean Intellectual Property Office on Nov. 30, 2015, the entire contents of which are incorporated herein by reference.

BACKGROUND

1. Technical Field

Example embodiments relate to an optical technique. More particularly, embodiments of the present inventive concept relate to an electronic shutter system.

2. Description of the Related Art

A shutter to control an exposure time of a laser light source may be classified as a mechanical shutter and an electronic shutter having no mechanical operation (or no mechanical motion, no mechanical movement).

The mechanical shutter is inexpensive and has an excellent light-blocking rate, but the mechanical shutter has a vibration due to mechanical operation when the mechanical shutter operates such that the mechanical shutter is difficult to use in situations (e.g., a situation where a precise environment such as a hologram recording is required).

The electronic shutter, e.g., an acousto-optic modulator (AOM) or a liquid crystal (LC) shutter, has no vibration, but the electronic shutter is expensive and has less performance than the mechanical shutter in term of light-blocking rate and in term of light efficiency.

SUMMARY

Some example embodiments provide a laser light source shutter system having a high light-blocking rate with a relatively low cost using a variable focus optical element such as a variable focus lens and a mirror.

According to example embodiments, a light source shutter system may include a light source; a variable focus optical element configured to transmit a beam emitted from the light source; a pinhole located on an optical path through which the beam travels from the variable focus optical element; and a controller configured to control a transmission and blocking of the beam by controlling a focal length of the variable focus optical element to be equal to a distance between the variable focus optical element and the pinhole or to be equal to other distances different from the distance.

In example embodiments, the controller may control the focal length of the variable focus optical element to be equal to the distance between the variable focus optical element and the pinhole when performing a shutter opening.

In example embodiments, the controller may control the focal length of the variable focus optical element to be equal to the others distances when performing a shutter blocking.

In example embodiments, the variable focus optical element may be a variable focus lens.

In example embodiments, the variable focus optical element may be a variable focus mirror.

In example embodiments, the light source shutter system may further include an exit optical element configured to output the beam passing through the pinhole, where the exit optical element is an exit lens or an exit mirror.

In example embodiments, the light source may be a laser light source.

A light source shutter method according to example embodiments emitting a beam using a light source; transmitting the beam to a pinhole located on an optical path through which the beam travels by transmitting the beam irradiated from the light source using a variable focus optical element; and controlling a transmission and blocking of the beam by controlling a focal length of the variable focus optical element to be equal to a distance between the variable focus optical element and the pinhole or to be equal to other distances different from the distance.

Therefore, a laser light source shutter according to example embodiments may be realized electrically and may be free from vibration with a low cost and a high light-blocking rate by using a variable focus optical element (e.g., a variable focus lens, a variable focus mirror).

In addition, a laser light source shutter according to example embodiments may allow a system using various wavelength bands to be easily implemented using a concave mirror.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Hereinafter, the present inventive concept will be explained in detail with reference to the accompanying drawings.

Figure 1:
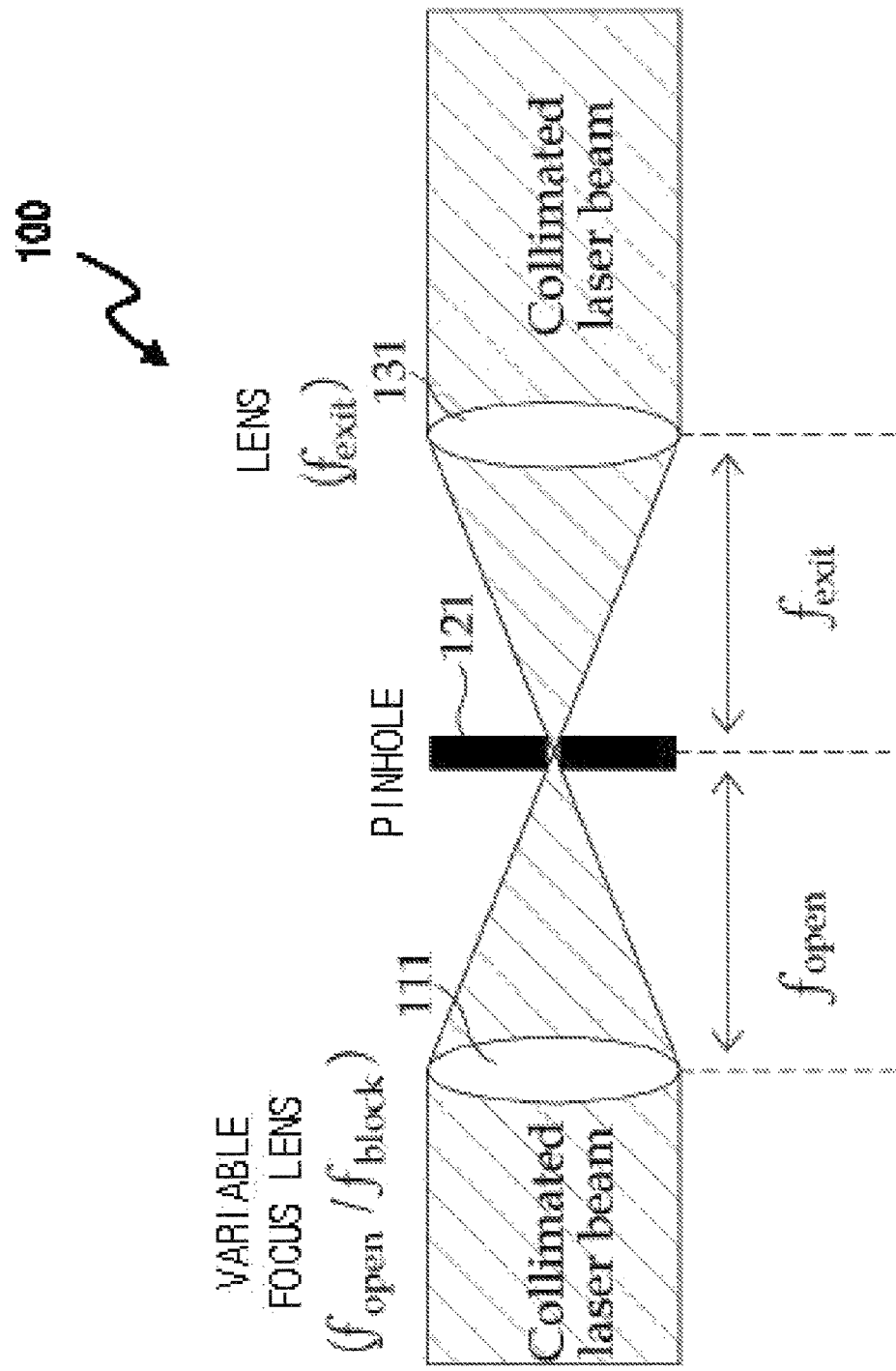
FIGS. 1 and 2 are diagrams illustrating an operation of a laser light source shutter using a variable focus lens.
Figure 2:
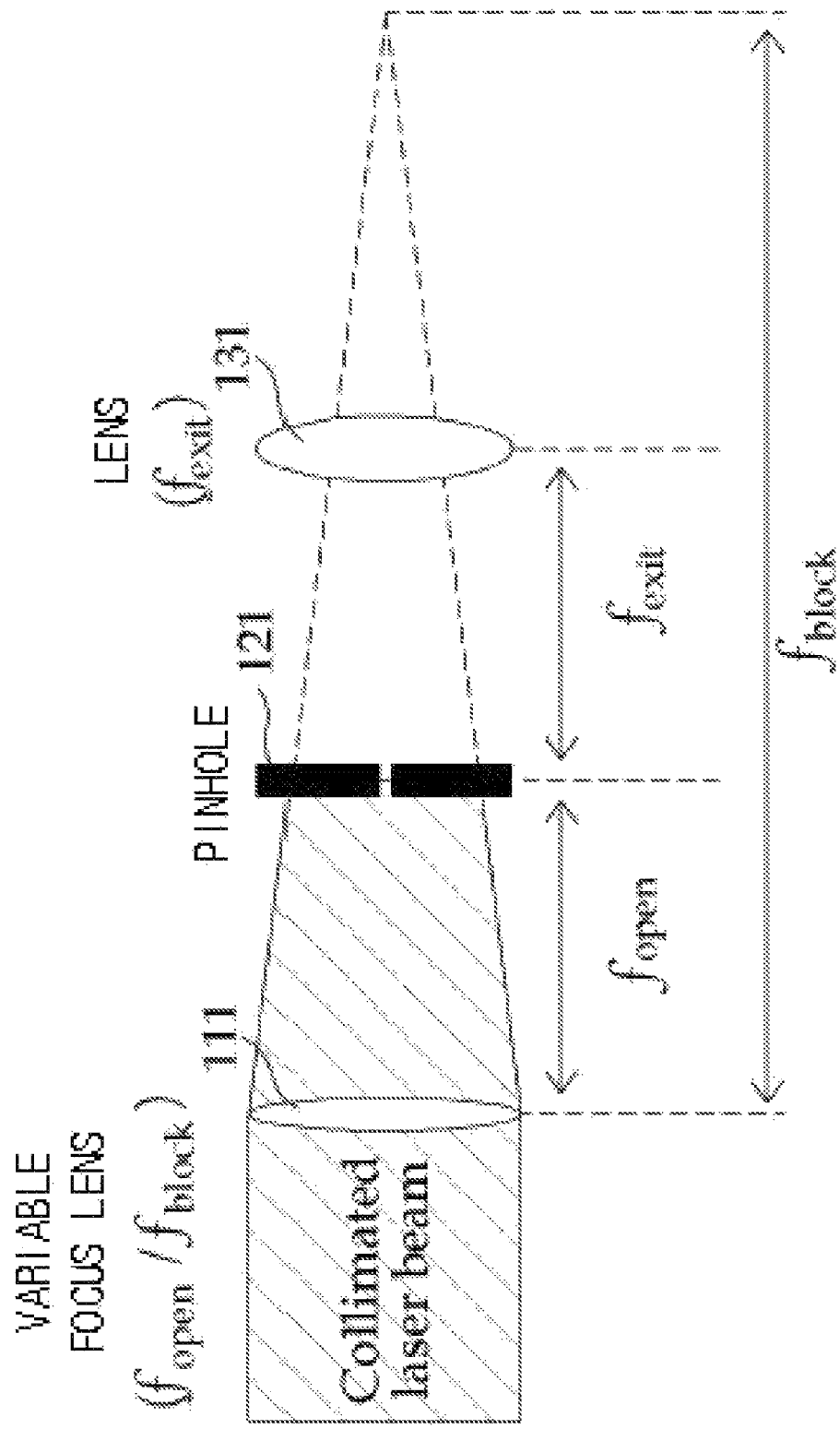

FIGS. 1 and 2 are diagrams illustrating an operation of a laser light source shutter using a variable focus lens.

The laser light source shutter 100 may include a variable focus lens 111, a pinhole 121, and an exit lens 131. The laser light source shutter 100 may transmit/block a laser light source (or a laser light) by electrically changing a focal length (or a focus) of a variable focus lens 111. Therefore, the laser light source shutter 100 may have a high light-blocking rate and a high light efficiency with a low cost without a vibration occurring in a mechanical shutter.

Referring to FIGS. 1 and 2, an operation (or an operation principle) of the laser light source shutter 100 using the variable focus lens 111 when a first focal length $f_{open}$ is shorter than a second focal length $f_{block}$ (i.e., $f_{open} < f_{block}$). FIG. 1 shows a case in which the laser light source shutter 100 is opened, and FIG. 2 shows a case in which the laser light source shutter 100 blocks a light source (or a case in which the laser source shutter is closed). Here, the first focal length $f_{open}$ may be a focal length of the variable focus lens 111 when the laser light source shutter 100 transmits (or passes) a light, and the second focal length $f_{block}$ may be a focal length of the variable focus lens 111 when the laser light source shutter 100 blocks a light. The first focal length $f_{open}$ may be different from the second focal length $f_{block}$ ($f_{open} \neq f_{block}$).

The variable focus lens 111 may be implemented as a liquid lens, a liquid crystal lens, or etc. As will be described later with reference to FIGS. 6 and 7, the variable focus lens 111 may be replaced with other types of variable focus optical element whose focal length can be changed, for example, a variable focus mirror, a phase deformable mirror (DM), a spatial light modulator (SLM), or etc.

The laser light source shutter 100 according to example embodiment may perform a shutter function by changing a focal length of the variable focus lens 111. Hereinafter, the first focal length $f_{open}$ when the laser light source shutter 100 is opened is denoted by $f_{open}$, and the second focal length $f_{block}$ when the laser light source shutter 100 blocks a light source is denoted by $f_{block}$, where $f_{open}$ is different from $f_{block}$ ($f_{open} \neq f_{block}$).

The laser light source shutter 100 according to example embodiments may include the lens 111, the pinhole 121, and the exit lens 131 which are aligned on an optical axis of a collimated laser beam. Here, the collimated laser beam is incident on the laser light source shutter 100 from an external component (e.g., a collimator). Here, a distance between the variable focus lens 111 and the pinhole 121 may be equal to $f_{open}$, and a distance between the pinhole 121 and the exit lens 131 may be equal to a third focal length $f_{exit}$ of the exit lens 131.

FIG. 1 shows a case in which the laser light source shutter 100 is opened with respect to the light source. In this case, the variable focus lens 111 may have the first focal length $f_{open}$. When the variable focus lens 111 has the first focal length $f_{open}$, the collimated laser beam may be focused on a hole of the pinhole 121 such that most of beam (or most of the collimated laser beam) may pass through the pinhole 121.

The passed beam may be again collimated by the exit lens 131, and the collimated laser beam may be output without loss of light quantity (or quantity of light, amount of light). Here, effects of beam expanding may also be present by adjusting a ratio of the first focal length $f_{open}$ and the third focal length $f_{exit}$.

FIG. 2 shows a case in which the laser light source shutter 100 blocks the light source. In this case, the variable focus lens 111 may have the second focal length $f_{block}$. When the variable focus lens 111 has the second focal length $f_{block}$, the collimated laser beam may be focused at a position (or a distance) different from a position (or a distance) of the pinhole 121.

Here, most of the beam (or most of the collimated laser beam) may be blocked such that light quantity (or quantity of light, amount of light) passing through the pinhole 121 may be very small. Especially, as a difference between the first focal length $f_{open}$ and the second focal length $f_{block}$ increases and as a size of the pinhole 121 (or a size of the hole of the pinhole 121) decreases, a light-blocking rate may increase.

Therefore, it is possible to realize a shutter capable of controlling transmission and interruption (or blocking) of the collimated laser beam without mechanical movement by changing a focal length of the variable focus lens 111 through optical configurations illustrated in FIGS. 1 and 2.

Figure 3:
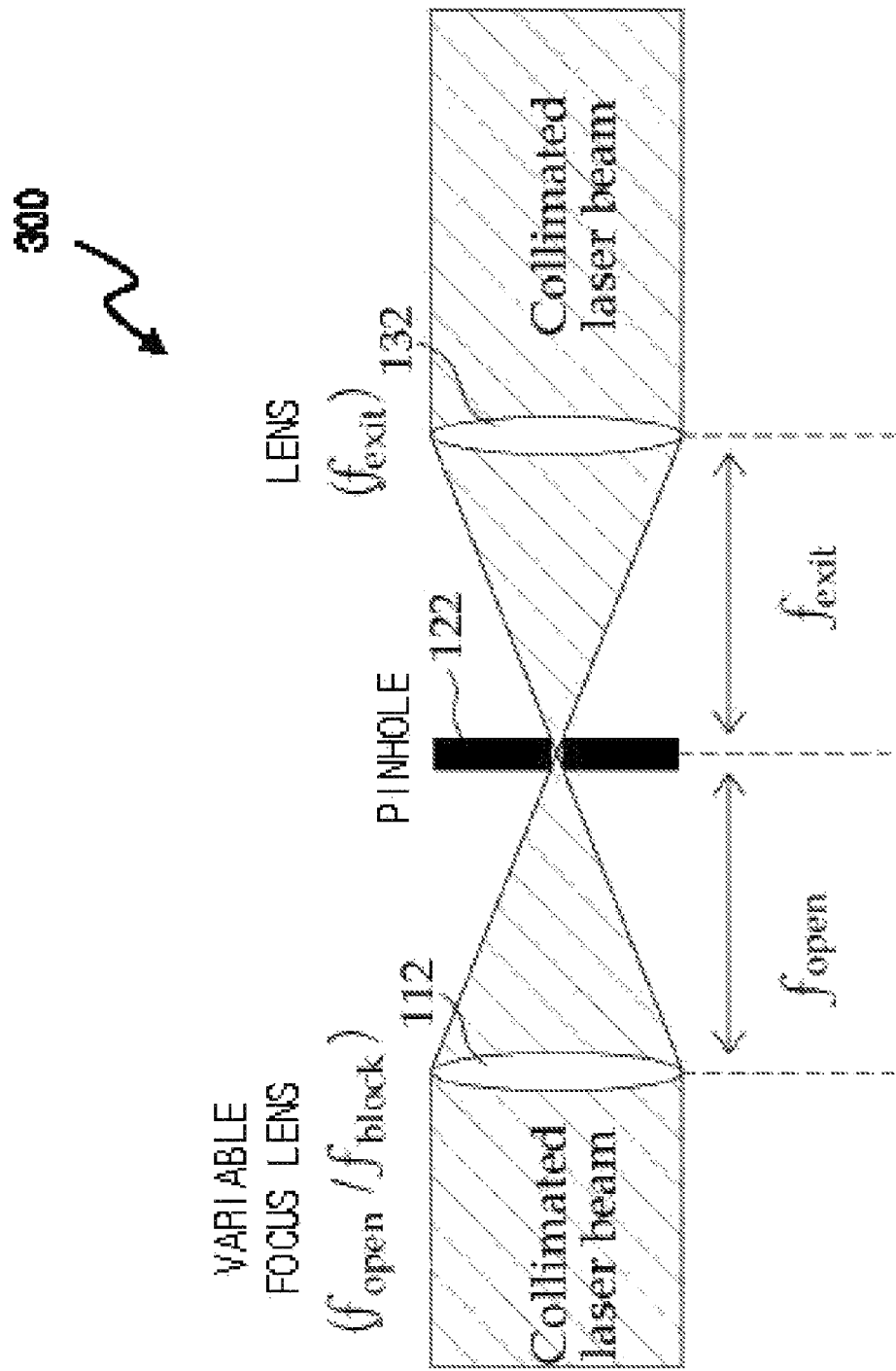
FIGS. 3 and 4 are diagrams illustrating an operation of a laser light source shutter using a variable focus lens.
Figure 4:
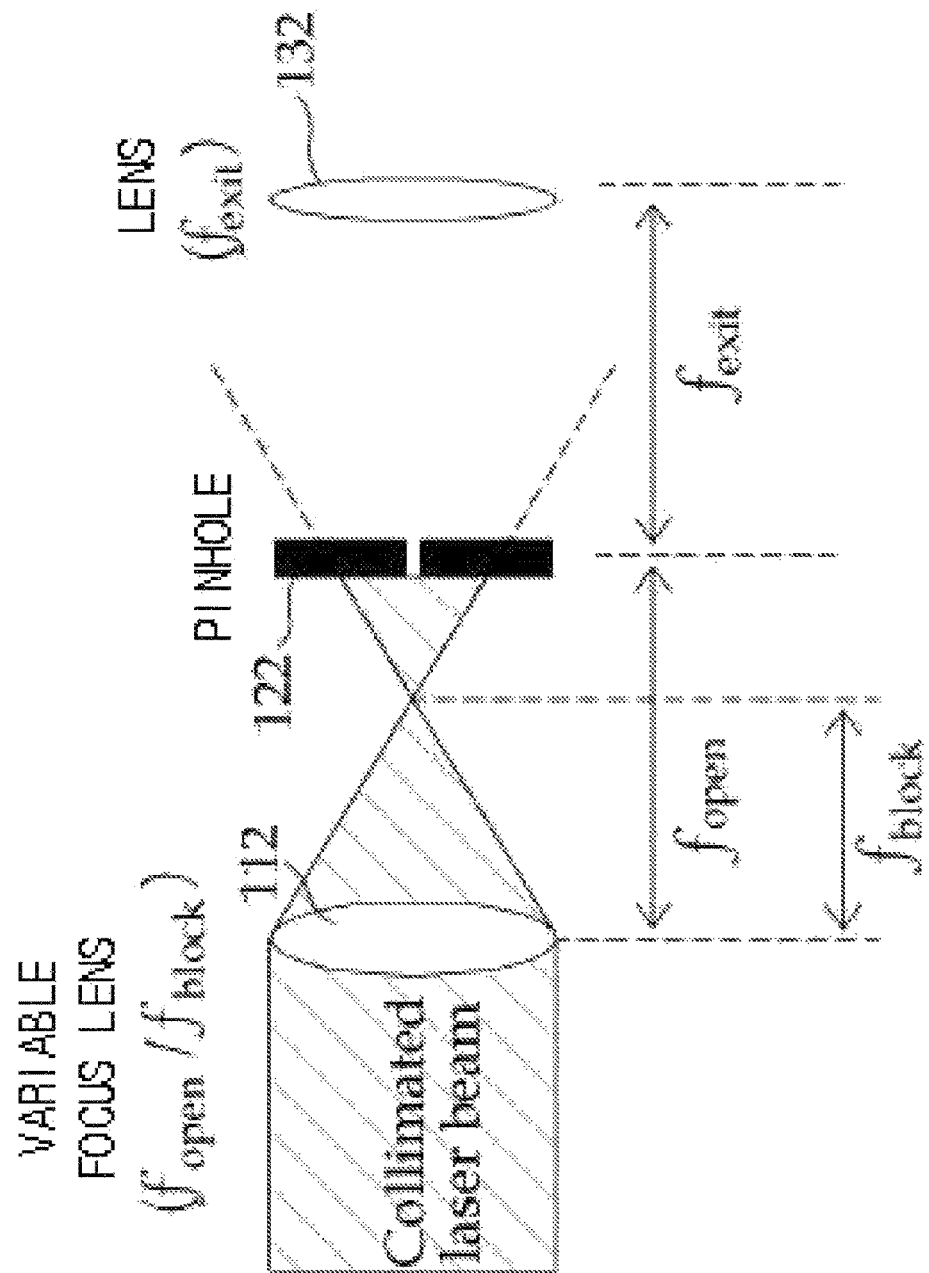

Referring to FIGS. 3 and 4, an operation (or an operation principle) of the laser light source shutter 300 using the variable focus lens 111 when the first focal length $f_{open}$ is longer than the second focal length $f_{block}$ (i.e., $f_{open} > f_{block}$). FIG. 3 shows a case in which the laser light source shutter 300 is opened, and FIG. 4 shows a case in which the laser light source shutter 300 blocks the light source (or a case in which the laser light source shutter 100 is closed).

The laser light source shutter 300 according to example embodiments may perform a shutter function by changing a focal length of the variable focus lens 111. The laser light source shutter 300 may include the variable focus lens 111, the pinhole 121, and the exit lens 131.

The laser light source shutter 300 illustrated in FIGS. 3 and 4 may be substantially the same as the laser light source shutter 100 illustrated in FIGS. 1 and 2 except that the first focal length $f_{open}$ is longer than the second focal length $f_{block}$ ($f_{open} > f_{block}$). The most of beam may pass through the pinhole 121 when the variable focus lens 111 has the first focal length $f_{open}$, and the most of the beam may be blocked by the pinhole 121 when the variable focus lens 111 has the second focal length $f_{block}$.

Hereinbefore, the operation (or the operation principle) of the laser light source shutters 100 and 300 have been described detail. Hereinafter, a laser light source shutter system using the laser light source shutters 100 and 300 will be described.

Figure 5:
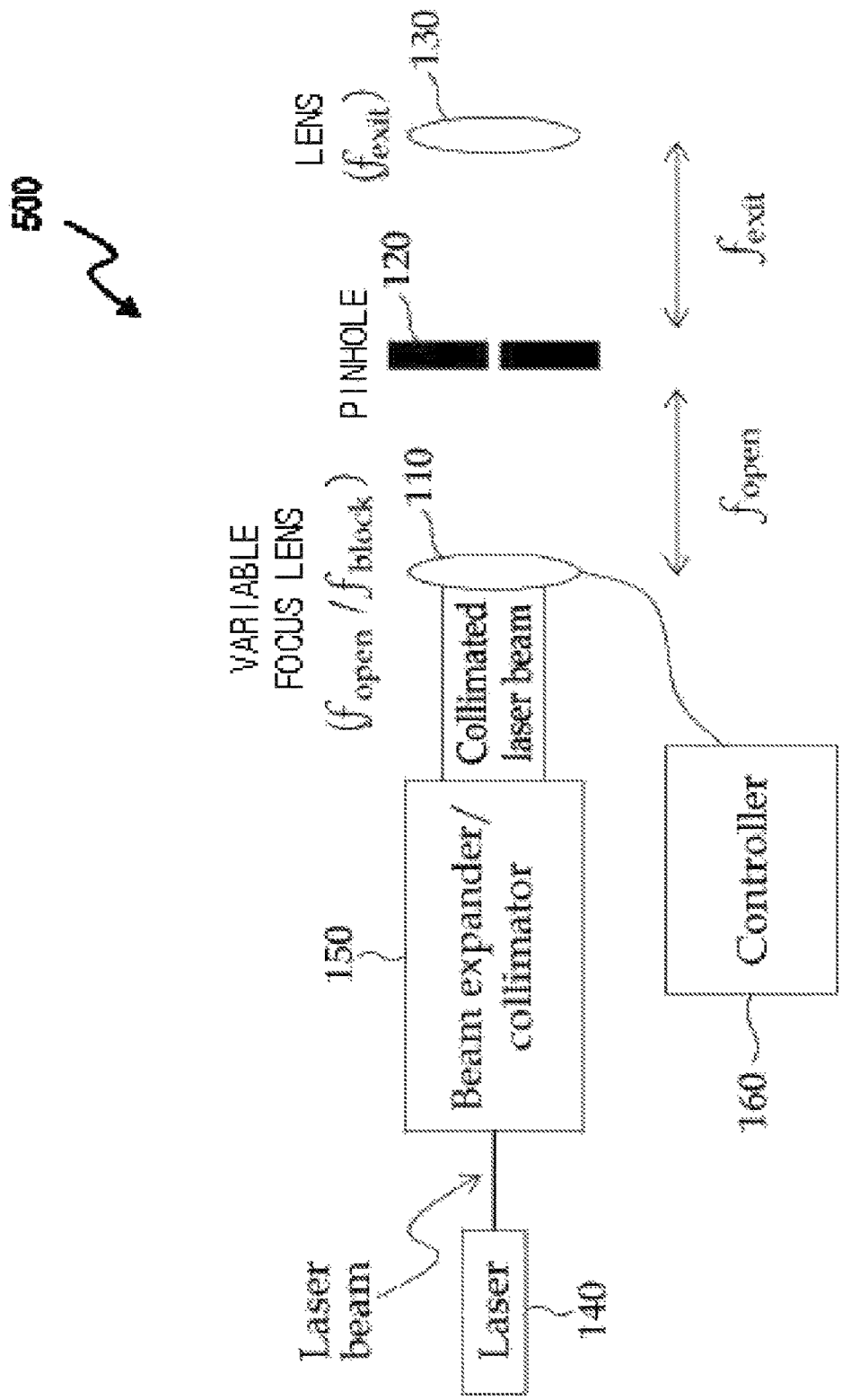
FIG. 5 is a diagram illustrating a laser light source shutter system according to example embodiments.

FIG. 5 is a diagram illustrating a laser light source shutter system according to example embodiments.

The variable focus lens 110, the pinhole 120, and the exit lens 130 illustrated in FIG. 5 may collectively refer to a configuration illustrated in FIGS. 1 and 2 and a configuration illustrated in FIGS. 1 and 2. That is, variable focus lens 110, the pinhole 120, and the exit lens 130 may be configured as a type illustrated in FIGS. 1 and 2 (e.g., a case in which the first focal length $f_{open}$ is shorter than the second focal length $f_{block}$, or $f_{open} < f_{block}$) and may also be configured as a type illustrated in FIGS. 3 and 4 (e.g., a case in which the first focal length $f_{open}$ is longer than the second focal length $f_{block}$, or $f_{open} > f_{block}$).

Referring to FIG. 5, the laser light source shutter system 500 may include a laser 140 (or a laser generator) outputting a laser beam, a beam expander/collimator 150 to amplify and collimate the laser beam, and a controller 160. In addition, the laser light source shutter system 500 may include the variable focus lens 110, the pinhole 120, and the exit lens 130.

The controller 160 may control a focal length of the variable focus lens 110 to be equal to the first focal length $f_{open}$ such that a shutter (or a laser light source shutter) is opened. In addition, the controller 160 may control the focal length of the variable focus lens 110 to be equal to the second focal length $f_{block}$ such that the shutter (or the laser light source shutter) is closed.

Figure 6:
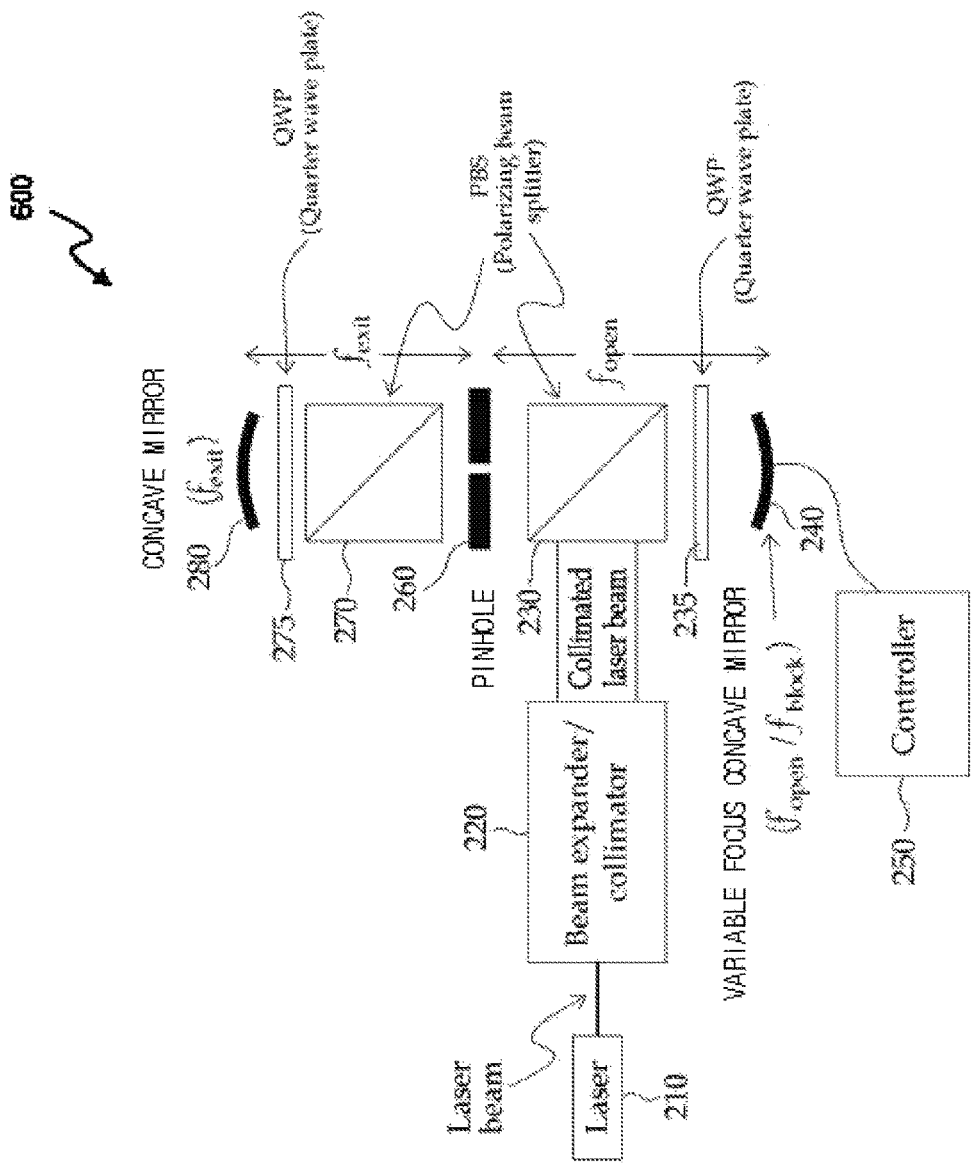
FIG. 6 is a diagram illustrating a laser light source shutter system according to example embodiments.

FIG. 6 is a diagram illustrating a laser light source shutter system according to example embodiments.

The laser light source shutter system 600 illustrated in FIG. 6 may include a variable focus concave mirror 240 instead of the variable focus lens 110 with respect to the laser light source shutter system 500 illustrated in FIG. 5. That is, the laser light source shutter system 600 may be implemented as a reflective type of the laser light source shutter.

The laser light source shutter system 600 according to example embodiments may include a laser 210, a beam expender/collimator 220, a first polarizing beam splitter (referred to as PBS-1) 230, a first quarter wave plate (referred to as QWP-1) 235, a variable focus concave mirror 240, a controller 250, a pinhole 260, a second polarizing beam splitter (referred to as PBS-2) 270, a second quarter wave plate (referred to as QWP-2) 275, and a concave mirror 280.

The variable focus concave mirror 240 may be implemented as a kind of a reflective variable focus element whose a focal length can be changed, e.g., a deformable mirror (DM), a phase spatial light modulator (SLM), or etc.

The laser beam output from the laser 210 may be expended and collimated by the beam expender/collimator 220, and the expended/collimated laser beam (or a light path of a collimated laser beam) may be turned 90 degrees by the PBS-1 230. Here, a polarization state of the laser beam may be aligned to match a reflection polarization of the PBS-1 230.

The laser beam reflected by the PBS-1 230 may pass through the QWP-1 235 and may be reflected by the variable focus concave mirror 240 which is connected (or electrically connected) to the controller 250. The variable focus concave mirror 240 may have two focal lengths (e.g., the first focal length $f_{open}$ and the second focal length $f_{block}$) by the controller 240 (or in response to a control signal of the controller 240). The pinhole 260 may be located apart from the variable focus concave mirror 240 by the first focal length $f_{open}$.

The laser beam reflected by the variable focus concave mirror 240 may again pass through the QWP-1 235, and a polarization state of the laser beam may be changed to match a transmission polarization of the PBS-1 230. Here, the laser beam may pass through the PBS-1 230 and may reach the pinhole 260.

After the pinhole 260, the PBS-2 270, QWP-2 275, and the concave mirror 270 having a third focal length $f_{exit}$ may be sequentially positioned. A distance between the pinhole 260 and the concave mirror 280 may be set to be equal to the third focal length $f_{exit}$.

When the a transmission polarization state of the PBS-2 may be aligned to match a polarization state of the laser beam passing through the pinhole 260, the laser beam passing through the pinhole 260 may reach the concave mirror 280. Here, the laser beam reflected by the concave mirror 280 may again pass through the QWP-2 275, and a polarization state of the laser beam may be changed to match the reflection polarization state of the PBS-2 such that the laser beam may be output (or emitted) to a right side of the PBS-2 270.

The controller 250 may control a focal length of the variable focus concave mirror 240 to be equal to the first focal length $f_{open}$ such that a shutter (or a laser light source shutter) is opened. In addition, the controller 160 may control the focal length of the variable focus concave mirror 240 to be equal to the second focal length $f_{block}$ such that the shutter (or the laser light source shutter) is closed.

A reflective shutter system (or the laser light source shutter system 600) illustrated in FIG. 6 may have no wavelength dependency of the variable focus concave mirror 240. Therefore, it is not necessary to configure shutter systems for each wavelength in an environment where various wavelength bands have to be used simultaneously, e.g., an environment for implementing a color hologram.

Figure 7:
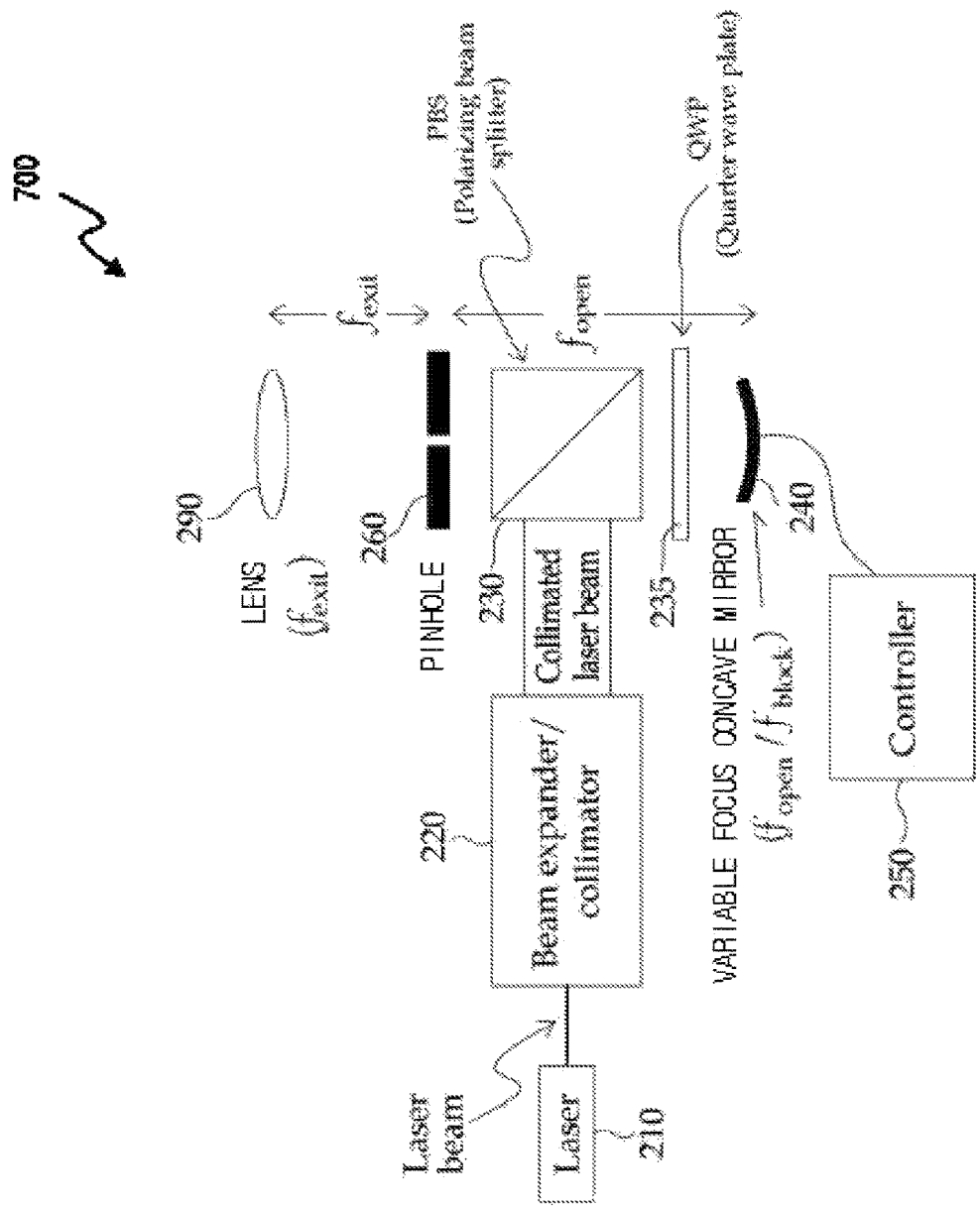
FIG. 7 is a diagram illustrating a laser light source shutter system according to example embodiments.

FIG. 7 is a diagram illustrating a laser light source shutter system according to example embodiments.

The laser light source shutter system 700 illustrated in FIG. 7 may include a exit lens 290 instead of the PBS-2 270, the QWP-2 275, and the concave mirror 280, which are components after the pinhole 260, with respect to the laser light source shutter system 600 illustrated in FIG. 6.

A distance between the pinhole 260 and the exit lens 290 may be set to be equal to the third focal length $f_{exit}$ of the exit lens 290.

Hereinbefore, the laser light source shutter systems 500, 600, and 700 according to example embodiments have been described detail.

In the above example embodiments, a laser is referred as a light source, but it is merely an example. The present inventive concept may be applied to any shutter system suing a light source different from a laser light source.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A light source shutter system comprising:
a light source;
a variable focus optical element to transmit a beam emitted from the light source;
a pinhole located on an optical path through which the beam travels from the variable focus optical element; and
a controller controlling the variable focus optical element to first have a first focal length being equal to a distance between the variable focus optical element and the pinhole to transmit the beam and then a second focal length being different from the first focal length to block the beam.

2. The light source shutter system of claim 1, wherein the variable focus optical element is a variable focus lens.

3. The light source shutter system of claim 1, wherein the variable focus optical element is a variable focus mirror.

4. The light source shutter system of claim 1, further comprising:
an exit optical element to output the beam passing through the pinhole,
wherein the exit optical element is an exit lens or an exit mirror.

5. The light source shutter system of claim 1, wherein the light source is a laser light source.

6. A light source shutter method comprising:
emitting a beam using a light source;
transmitting the beam to a pinhole located on an optical path through which the beam travels by transmitting the beam irradiated from the light source using a variable focus optical element; and
controlling the variable focus optical element to first have a first focal length being equal to a distance between the variable focus optical element and the pinhole and then a second focal length being different from the first focal length to block the beam.

7. The light source shutter system of claim 1, wherein the first focal length is greater than the second focal length to block the beam.

8. The light source shutter system of claim 1, wherein the first focal length is smaller than the second focal length to block the beam.

9. A light source shutter system, comprising:
   a laser outputting a laser beam;
   a beam expander/collimator expanding and collimating the laser beam output from the laser;
   a first polarizing beam splitter by which the expended and collimated laser beam is turned 90 degrees;
   a first quarter wave plate through which the laser beam reflected by first polarizing beam splitter passes;
   a variable focus concave mirror by which the laser beam from the first quarter wave plate is reflected,
   a controller to control the variable focus concave mirror to have a first focal length to transmit the laser beam and a second focal length to block the laser beam;
   a pinhole located apart from the variable focus concave mirror by the first focal length; and
   either (i) a first component comprising a second polarizing beam splitter, a second quarter wave plate, and a concave mirror which are sequentially positioned or (ii) a second component comprising an exit lens;
   wherein the variable focus concave mirror, the first quarter wave plate, the first polarizing beam splitter, the pinhole, and either the first component or the second component are sequentially positioned.

10. The light source shutter system of claim 9, wherein the variable focus concave mirror is a deformable mirror or a phase spatial light modulator.

11. The light source shutter system of claim 9, wherein the variable focus concave mirror, the first quarter wave plate, the first polarizing beam splitter, the pinhole, the second polarizing beam splitter, the second quarter wave plate, and the concave mirror are sequentially positioned.

12. The light source shutter system of claim 9, wherein the variable focus concave mirror, the first quarter wave plate, the first polarizing beam splitter, the pinhole, and the exit lens are sequentially positioned.

* * * * *